United States Patent
Patel et al.

(10) Patent No.: US 11,195,101 B2
(45) Date of Patent: *Dec. 7, 2021

(54) DETERMINING APPLICATIONS BASED ON INTERACTIONS OF DIFFERENT ELECTRONIC DEVICES

(71) Applicant: International Business Machines Corporation, Armonk, NY (US)

(72) Inventors: Apurva S. Patel, Pune (IN); Rajesh Patil, Pune (IN); Sunanda Patil, Pune (IN); Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 15/813,211

(22) Filed: Nov. 15, 2017

(65) Prior Publication Data

US 2018/0075352 A1 Mar. 15, 2018

Related U.S. Application Data

(63) Continuation of application No. 15/238,841, filed on Aug. 17, 2016.

(51) Int. Cl.
  *G06F 8/61* (2018.01)
  *G06F 9/50* (2006.01)
  *G06N 5/02* (2006.01)
  *G06F 9/48* (2006.01)

(52) U.S. Cl.
  CPC ............... *G06N 5/02* (2013.01); *G06F 8/61* (2013.01); *G06F 9/4881* (2013.01); *G06F 9/5027* (2013.01)

(58) Field of Classification Search
  CPC .......... G06N 5/02; G06F 8/61; G06F 9/4881; G06F 9/50; G06F 9/5027
  See application file for complete search history.

(56) References Cited

U.S. PATENT DOCUMENTS

| | | |
|---|---|---|
| 7,289,947 B2 | 10/2007 | Ammons |
| 8,914,399 B1 | 12/2014 | Paleja et al. |
| 9,111,219 B1* | 8/2015 | Mohla ............... G06N 20/00 |
| 2004/0261052 A1* | 12/2004 | Perry ............... G06F 30/30 |
| | | 326/41 |
| 2006/0156307 A1 | 7/2006 | Kunjithapatham et al. |
| 2006/0282825 A1 | 12/2006 | Taylor |
| 2007/0046664 A1 | 3/2007 | Raspl et al. |

(Continued)

OTHER PUBLICATIONS

Anonymous, "Triggering Mobile App for Selection Based on Accelerometer Motion", an IP.com Prior Art Database Technical Disclosure, Mar. 26, 2012. IP.com No. IPCOM000216232D. 4 pages.

(Continued)

*Primary Examiner* — James R Sheleheda
(74) *Attorney, Agent, or Firm* — Rachel M. Yadlosky (57) ABSTRACT

A plurality of computing devices, in a set of computing devices, each perform one or more tasks. A program monitors the tasks performed on each of the computing devices and determines a usage pattern. Based on the usage pattern the program determines one or more programs available for one or more of the computing devices. The program outputs a recommendation to install one or more of the available programs on one or more of the computing devices.

9 Claims, 5 Drawing Sheets

(56) References Cited

U.S. PATENT DOCUMENTS

| | | | |
|---|---|---|---|
| 2008/0178172 A1 | 7/2008 | Dossa et al. | |
| 2012/0109889 A1 | 5/2012 | Wu et al. | |
| 2012/0311571 A1 | 12/2012 | Morgan | |
| 2013/0160014 A1 | 6/2013 | Watanabe et al. | |
| 2014/0180744 A1 | 6/2014 | Kozloski et al. | |
| 2014/0280131 A1 | 9/2014 | Martens et al. | |
| 2015/0128131 A1* | 5/2015 | Cao | G06F 9/4856 718/1 |
| 2015/0278374 A1 | 10/2015 | Van De Poel et al. | |
| 2016/0070601 A1* | 3/2016 | Yamamoto | G06F 9/5088 718/105 |
| 2016/0239322 A1 | 8/2016 | Watanabe et al. | |
| 2017/0052826 A1 | 2/2017 | Sasaki et al. | |
| 2017/0168905 A1 | 6/2017 | Wu et al. | |
| 2017/0169351 A1 | 6/2017 | Guo et al. | |
| 2017/0185250 A1 | 6/2017 | Cho et al. | |
| 2017/0255484 A1 | 9/2017 | Nakashima | |
| 2017/0277556 A1 | 9/2017 | Ishii et al. | |
| 2017/0351553 A1 | 12/2017 | Terayama et al. | |
| 2018/0024829 A1* | 1/2018 | Sung | G06F 8/62 717/172 |
| 2018/0053094 A1* | 2/2018 | Patel | G06N 5/02 |
| 2018/0075352 A1 | 3/2018 | Patel et al. | |
| 2018/0196683 A1 | 7/2018 | Radebaugh et al. | |
| 2018/0341574 A1 | 11/2018 | Ekambaram et al. | |
| 2018/0352091 A1 | 12/2018 | Puri et al. | |
| 2018/0359148 A1 | 12/2018 | Jones et al. | |
| 2019/0098465 A1 | 3/2019 | Butts | |
| 2019/0324628 A1 | 10/2019 | Kim et al. | |

OTHER PUBLICATIONS

Hustedt-Teo, "Cross Device Tracking: How Customers Truly Interact With Brands", Ingenious Technologies, Mar. 25, 2015. https://www.ingenioustechnologies.com/cross-device-tracking/ Last accessed Jun. 2, 2016. 6 pages.

Patel et al., "Determining Applications Based on Interactions of Different Electronic Devices," U.S. Appl. No. 15/238,841, filed Aug. 17, 2016.

List of IBM Patents or Patent Applications Treated as Related, Dated Nov. 13, 2017, 2 pages.

* cited by examiner

USAGE MATRIX 300

| PATTERN NUMBER | DEVICE INTERACTION | DEVICES | APPLICATION ACTION |
|---|---|---|---|
| 1 | 31A. MOBILE → INTERNET<br>32A. MOBILE → LAPTOP<br>33A. LAPTOP → PRINTER | MOBILE<br>LAPTOP<br>PRINTER<br>WIFI | 31B. DOWNLOAD FILE<br>32B. TRANSFER MOBILE TO LAPTOP<br>33B. PRINT FILE |
| 2 | 34A. LAPTOP → SCANNER<br>35.A SCANNER → LAPTOP<br>36A. LAPTOP → MOBILE<br>37A. MOBILE → MSG APP | MOBILE<br>LAPTOP<br>SCANNER | 34B. CONNECT TO SCANNER<br>35B. SCAN DOCUMENT TO FILE<br>36B. TRANSFER FILE TO MOBILE<br>37B. SEND FILE |

DETERMINING APPLICATIONS BASED ON INTERACTIONS OF DIFFERENT ELECTRONIC DEVICES

BACKGROUND

The present disclosure relates to identifying programs to recommend for a set of computing devices. More specifically, the present disclosure relaters to identifying programs based on interactions of computing devices among a set of computing devices.

SUMMARY

Aspects of the disclosure provide a method, system, and computer program product reduce the interactions of computing devices included in a set of computing devices. In one embodiment, a processor can perform the method to detect a first computing device in the set of devices performing a first task and a second computing device performing a second task. The processor determines that the second computing device performs the second task in association with the first computing device performing the first task. Based on the second computing device performing the second task in association with the first computing device performing the first task, the processor determines a usage pattern. Based on the usage pattern, the processor identifies one or more programs that are executable by the first computing device and that can enable the first computing device to perform the second task. The processor outputs a recommendation to install the program(s) on the first computing device.

In some embodiments, outputting the recommendation results in a notification to a user of the first computing device. Also, in some embodiments, the recommendation includes an identity of the program(s) and a location from which the user can obtain the program(s).

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to identifying applications that can potentially reduce the interactions of a set of computing devices, which can potentially enhance productivity of a user of the computing devices. More particular aspects relate to identifying programs to include on one or more of the computing devices, based on the tasks performed by and the interactions of the computing devices. While the present disclosure is not necessarily limited to such applications, various aspects of the disclosure may be appreciated through a discussion of various examples using this context.

Human users and/or automated applications can employ a wide range of computing device types to perform a variety of user tasks. User tasks can include receiving or sending media files (e.g., documents, audio, or video) via email or messaging applications, or scanning or printing documents, and transferring information (e.g., media files) between computing devices. As used herein, "user" refers to a human user, an application (or, a suite of applications), or a combination of both, that employs interacting computing devices to perform particular user tasks.

In performing such tasks, users can employ, for example, —individually or in various combinations—a variety of interacting computing devices, such as a virtual computer (e.g., a virtual computer provided in a computing cloud environment), a desktop computer, a laptop computer, a tablet computer, a mobile or "smart" phone, or a wearable computing device, such as a "smart" watch. As used herein, "computing device", or "device", refers to any form of a device capable of executing software programs, including but not limited to the foregoing examples.

Such computing devices can execute programs that span a range of program types, such as firmware, "applications", "widgets", web browsers, and programs that operate within a web browser. As used herein, "application" refers to any program that such computing devices can execute, including but not limited to the foregoing examples. Such applications can in turn be provided by a large group of software developers, or enterprises, and it can be difficult for human users to be aware of the availability of a particular application for a particular computing device.

Figure 1A:
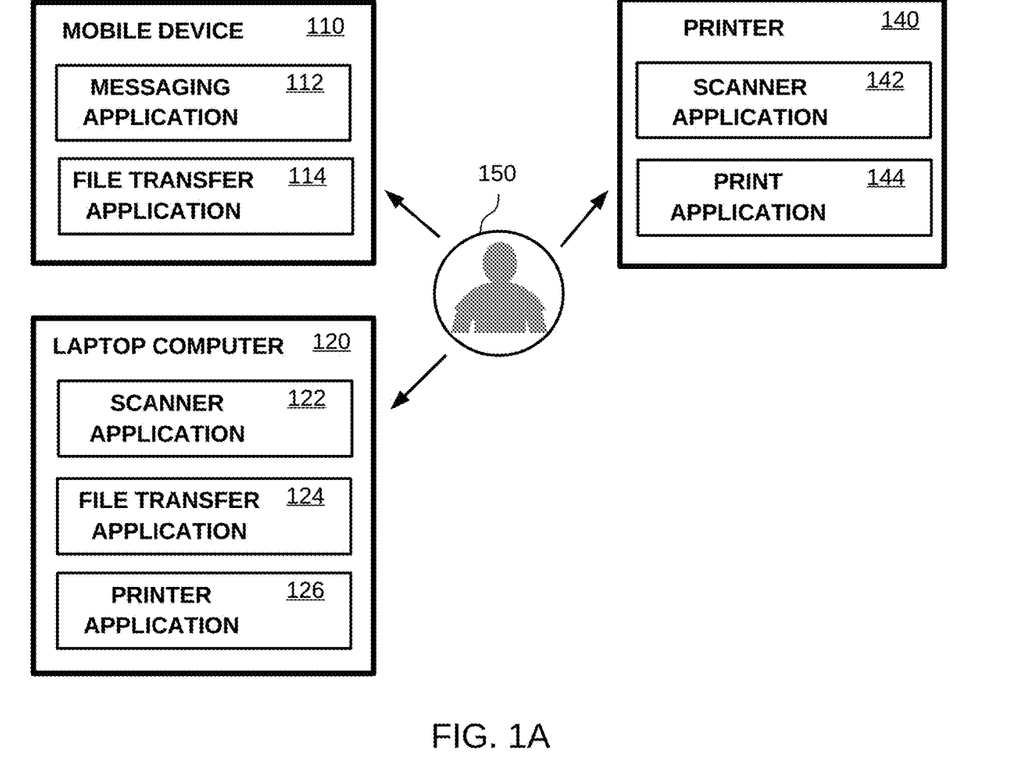
FIG. 1A illustrates examples of computing devices performing various tasks, according to aspects of the disclosure.

A user can initiate a particular task, or interaction with another user, and a variety of computing devices can interoperate to perform a particular computing task or application associated with the user task. FIG. 1A illustrates examples, according to embodiments of the disclosure (hereinafter, "embodiments"), of computing devices and applications that a user can employ in performing a particular task, or in the course of interacting with other users of other devices. As illustrated in FIG. 1A, user 150 can employ computing devices such as mobile device 110, computer 120, and printer 140 to perform various tasks or to interact with other users. While the example of FIG. 1A illustrates human users performing the various tasks, it would be understood by one of ordinary skill in the art that one or more of the tasks can be automated by one or more of the interoperating computing devices, or by another computing device that is in communication with the interacting computing devices.

Each of the computing devices can include applications that enable the device to perform a particular user task, or an aspect thereof. As illustrated in the examples of FIG. 1A, mobile device 110 includes messaging application 112, which can enable user 150 to exchange messages (e.g., email or SMS messages) with other users. The messages can include, for example, simple text statements, voice messages, and/or digital media files (e.g., documents, pictures, music, or videos). Mobile device 110 also includes file transfer application 114, which can interact with a file transfer application on another computing device, such as file transfer application 124 on computer 120, to enable user 150 to transfer a file between the mobile device 110 and the computer 120.

Printer 140 includes scanner application 142, which can enable user 150 to scan a document, or picture, and possibly to transfer a digital copy of the scanned item to another device, such as to computer 120. Computer 120 includes scanner application 122, which can enable computer 120 to receive the scanned copy from printer 140. Printer 140 further includes print application 144, which can enable user 150 to print a document (or, a picture, for example) received from another device, such as to computer 120. Computer 120, for example, includes printer application 126 (e.g., a printer driver), which can enable computer 120 to format a document for printing (possibly in a manner specific to the design of printer 140), to communicate the formatted document to printer 140, and to initiate printer 140 printing the document.

Figure 1B:
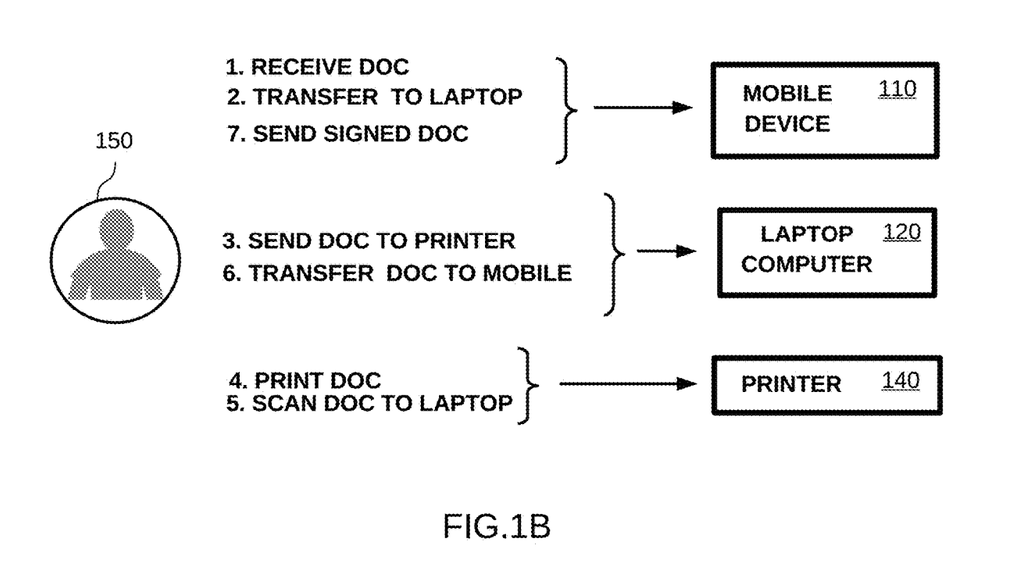
FIG. 1B illustrates an example of performing a task involving a plurality of computing devices and programs, according to aspects of the disclosure.

FIG. 1B illustrates an example, according to embodiments and in the context of FIG. 1A, of a user employing a plurality of devices (and/or applications on the devices) to perform a set of related tasks. For purposes of the illustration, but not intended to limit embodiments, the example is described using the context of FIG. 1A. A transaction interaction between user 150 and another user can serve to illustrate user 150 performing the various tasks. For example, the interaction can be part of a sales transaction between user 150 and the other user, in which user 150 receives a document requiring the signature of user 150 and to transmit a copy of the signed document to the originating user.

The example user interaction can require user 150 to use several computing devices which each perform individual tasks that then together accomplish, or complete, the interaction. For example, user 150 can use mobile device 110 to receive the document, but mobile device 110 may not have an application that can print the document for signing. Accordingly, to receive the original document and transmit the signed document can require user 150 to use mobile device 110, computer 120, and printer 140, each performing one or more of tasks 1 through 7 of FIG. 1B, to complete the document-signing interaction with the other user.

In task 1, the mobile device 110 receives the document as a digital media file. For example, a messaging application, such as 112 of FIG. 1A, can receive the media file. Mobile device 110 may not include a printer application (or, an application compatible with printer 140, for example) but, as illustrated in FIG. 1A, computer 120 does include such an application (assumed, for the example, to be compatible with printer 140). Accordingly, in task 2, mobile device 110 transfers the media file from mobile device 110 to computer 120 based on input from user 150. For example, file transfer application 114 on mobile device 110 can be used in conjunction with file transfer application 124 on computer 120 to accomplish the transfer.

In task 3, computer 120 communicates the media file to printer 140, and printer 140, in task 4, prints a paper copy of the original document. Computer 120 executing printer application 126 can also format the media file in a particular manner suitable for the particular printer (e.g., type and model of printer). After signing the paper copy, user 150 may need, or intend, to use mobile device 110 to transmit a digital copy of the signed document to the other (originating) user. For example, the originating user may require user 150 to transmit the digital copy by means of the same messaging application 112, by which mobile device 110 received the original, unsigned document. However, mobile device 110 does not (as shown) include a scanner application, or other means to create a digital copy of the signed document. Accordingly, in task 5 user 150 uses printer 140 to scan the signed document into a digital copy.

As shown, printer 140 does not include a file transfer application (e.g., an application that can transfer files to a mobile device) and, in order to transfer the scanned, digital copy to mobile device 110, user 150 may need to use computer 120, which, as shown in FIG. 1A, includes file transfer application 124 capable of transferring files to a mobile device. Thus, in task 5, printer 140 transfers the scanned, digital copy from printer 140 to computer 120 so that, in task 6, computer 120 can use file transfer application 124 to transfer the digital copy to mobile device 110. Finally, in task 7, mobile device 110 completes the interaction by sending the digital copy of the signed document to the originating user.

As can be appreciated from the example, utilizing a plurality of computing devices and applications of those devices can add complexity to an interaction between users, or a task performed by a user, and possibly take much more time than the interaction performed on only one, or fewer, computing devices and utilizing one or fewer applications on those devices. If an application is available for a device that a user employs in performing tasks, or interacting with other users, in which the application provides function to that computing device that is equivalent to or can substitute for one or more other computing devices used in the tasks or interaction, it can be more efficient to install and utilize that application on that computing device. For example, installing a scanner application on a mobile device can save the user the time and effort to locate a scanner device and/or computer, scan a document into the computer, and transfer the scanned, digital copy of the document from the computer to a mobile device in order to transmit the scanned copy to another device.

Figure 2A:
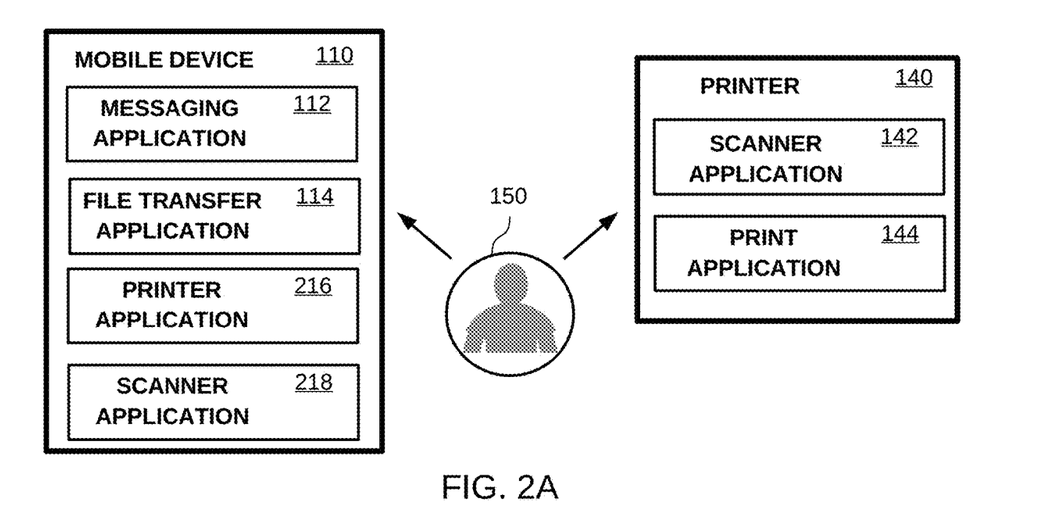
FIG. 2A illustrates examples of computing devices with an alternate set of programs for performing various tasks, according to aspects of the disclosure.
Figure 2B:
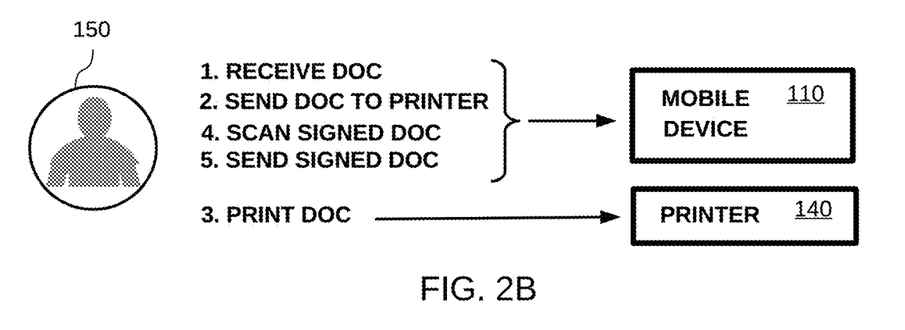
FIG. 2B illustrates example of performing a task involving a reduced set of computing devices, according to aspects of the disclosure.

FIGS. 2A and 2B illustrate another example, according to embodiments, of computing devices and applications that a user (e.g., user 150 in FIG. 2A) can employ in various tasks or interactions with other users. The examples of FIGS. 2A and 2B illustrate, in contrast to the example of FIGS. 1A and 1B, that with the addition of particular applications user 150 can require only mobile device 110 and printer 140 to perform the same interaction as described in FIG. 1B.

FIG. 2A illustrates printer 140 including applications 142 and 144, as also illustrated in FIG. 1A. FIG. 2A further illustrates mobile device 110 including message application 112 and file transfer application 114, also as illustrated in FIG. 1A. However, as illustrated in FIG. 2A mobile device 110 further includes printer application 216 and scanner application 218. Printer application 216 can be a mobile device application that supports printing to, for example, printer 140. Scanner application 218 can be a mobile device application that supports scanning a document using the mobile device itself. For example, if the mobile device includes a camera, scanner application 216 can use the camera to photograph a page of a document and convert it to a digital format for storage on the mobile device. Alternatively, scanner application 218 can interoperate with scanner application 144 on printer 140 to enable mobile device 110 to directly receive a scanned copy of a document from printer 140.

FIG. 2B illustrates that user 150 can accomplish the transaction illustrated in FIG. 1B by performing 5 tasks, using only mobile device 110 and printer 140, in contrast to the 7 tasks and 3 devices required in the example of FIG. 1B. In task 1 of FIG. 2B, user 150 receives, on mobile device 110, a digital copy of the document requiring user 150's signature. In task 2, application 216 on mobile device 110 formats and sends the digital copy to printer 140 for printing. In task 3, printer 140 receives the formatted document and prints it. In task 4, scanner application 218 on mobile device 110, scans the signed document to generate a digital copy stored on mobile device 150. To complete the transaction, in task 5, mobile device 110 imports the digital copy into messaging application 112 and transmits the copy to the originating user. As can be seen in the example of FIG. 2B, in contrast to FIG. 1B, the tasks, devices, and applications utilized to complete the interaction are fewer, less complex, and potentially consume less time.

However, applications 216 and 218 for mobile device 110 can be among, for example, many hundreds of thousands of applications available for mobile device 110. Further, applications 216 and 218 can be available from a particular one, or particular few sources (e.g., an application library or "store") among a large number of possible sources (e.g., a variety of world wide web URLs). Consequently, user 150 can be unaware of the availability of applications 216 and 218 for mobile device 110, or from which source to obtain them.

Accordingly, in embodiments a program can monitor tasks that a user performs with each of a variety of computing devices, as well as the interactions of those devices, and the tasks and device interactions can be related so as to comprise a "usage pattern". Such a usage pattern can reflect that the tasks and/or devices are related in accomplishing a particular, broader task of a user (e.g., receiving and printing a digital document). The monitoring program can be installed on one or more of a user's computing devices, or can be installed on another computing device that can detect tasks that the user performs with various devices, or the interactions of the devices. For example, a cloud computing service can include a program that detects tasks a user performs with the cloud service or with devices that connect to that service, and/or the interactions of those devices.

As a result of monitoring the interactions of the various computing devices in performing the various tasks, the program can derive usage patterns and, from the usage patterns, can determine applications, not presently installed or in use on a particular device, that can consolidate tasks into one or fewer applications or devices to perform a task, or can perform tasks more efficiently. For example, a program can monitor the interactions of the computing devices illustrated in FIG. 1A in performing the tasks illustrated in FIG. 1B and derive a usage pattern. The program can determine, from that usage pattern, that the addition of printer application 216 and scanner application 218 to mobile device 110, as illustrated in FIG. 2A, can eliminate the use of one or more devices (e.g., computer 130 in FIG. 1A) or applications (e.g., file transfer applications 114 and 144) from the tasks performed to accomplish transactions such as illustrated in FIG. 1B.

An embodiment can record tasks a user performs, the particular devices used to perform the tasks, the particular interactions of the computing devices, and/or the particular applications used to perform the tasks. An embodiment can analyze (e.g., using the record) to associate a set of tasks and/or devices and determine a usage pattern, based on various criteria. For example, usage patterns can be based on a set of user tasks occurring within a particular span of time (e.g., within seconds, or a few minutes, of each other). In another example, a usage pattern can be based on a set of tasks involving a series of connections (e.g., devices making connections to each other over a WIFI network) or interactions between user devices (e.g., exchanging files or in some other manner communicating with each other).

In yet another example, a usage pattern can be based on a set of tasks involving a particular set of applications on the computing devices, such as a file transfer application on one device (e.g., a scanner) sending a file to another device (e.g., a computer) that receives the file by a file transfer application, and possibly that other device further transferring (using a file transfer application) the file to yet another device (e.g., a mobile device) that receives the file using a file transfer application. A usage pattern can be based on a particular set of applications and/or devices processing the same file, or a set of related files.

Figure 3:
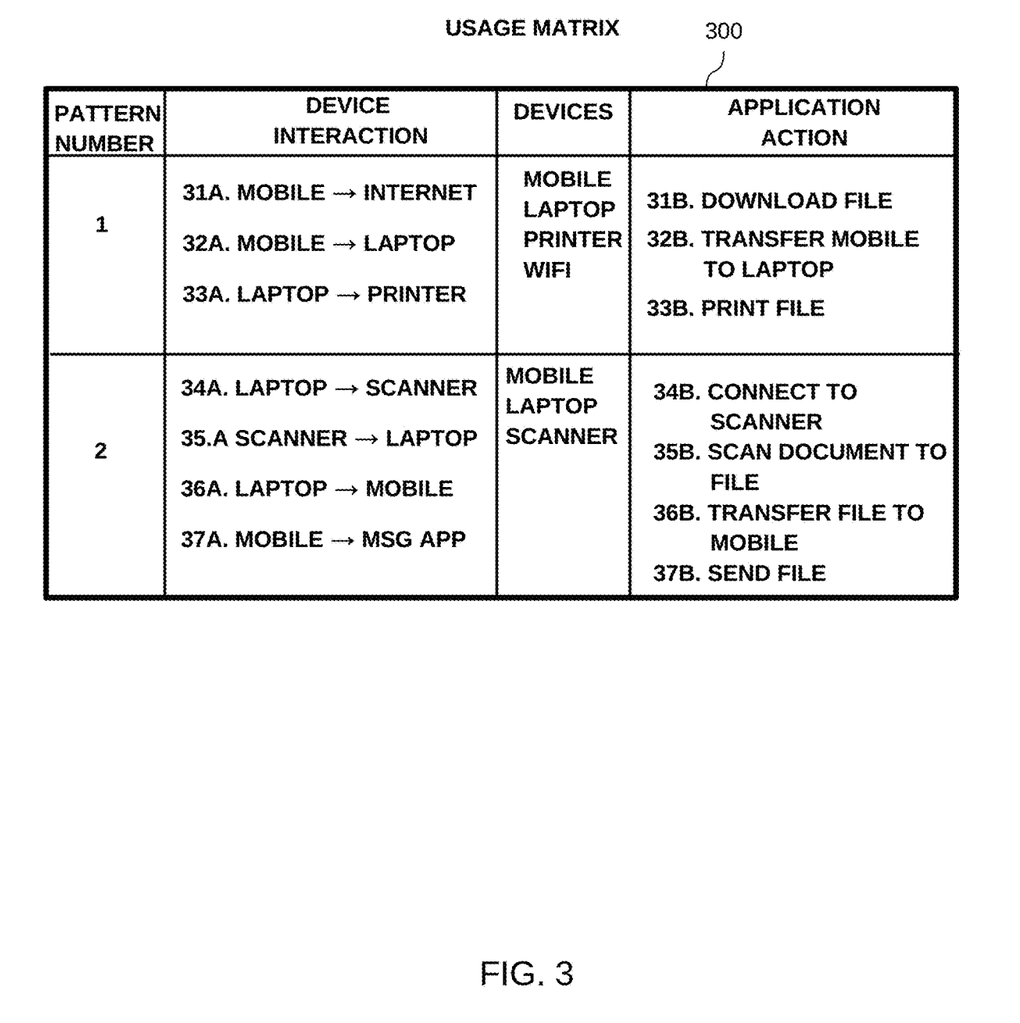
FIG. 3 illustrates an example usage pattern matrix, according to aspects of the disclosure.

FIG. 3 illustrates an example structure, usage matrix 300, which an embodiment can employ to record devices, connections, applications, and particular interactions of the devices and/or applications involved in performing tasks, and that a program can analyze to determine a usage pattern. For purposes of illustrating the example, FIG. 3 illustrates usage matrix 300 in a table format. However, it would be apparent to one of ordinary skill in the art that a variety of alternative data structures (e.g., a database, multi-dimensional arrays, etc.) can be used to record task and/or device information such as that illustrated in usage matrix 300.

Usage matrix 300 includes, for example, columns to record interactions between computing devices, the devices involved, and tasks performed (e.g., an application action) using the devices. Usage pattern matrix 300 can be indexed by a pattern number (e.g., pattern number 1, or 2, as illustrated) corresponding to a series of tasks that can be related.

For example, usage pattern number "1" in usage matrix 300 records 3 device interactions: 31A, 32A, and 33A. Interaction 31A records a user mobile device connecting to the internet, which can also involve a WIFI router connected to the mobile device. Interaction 32A records the user mobile device interacting with a user computer computing device, and 33A records the user computer interacting with a printer. The mobile device, computer, and printer can all be connected by a WIFI network, and so can also involve a WIFI router. Alternatively, some or all of the devices can be connected by, for example, interface cables or through a cloud computing service. The devices column of usage matrix 300 records the devices used in the various interactions associated with pattern number 1.

Each device interaction can correspond to an application action (and, possibly, to one or more particular applications on one or more of the devices used, not shown in FIG. 3). Device interaction 31A, for example, can correspond to a file download application performing application action 31B to download a file from the internet. Application action 32B can correspond to file transfer applications on the mobile device and computer transferring (32A) the downloaded file between them, and application action 33B can correspond to the computer sending (33A) the file to a printer for printing.

The combination of device interactions 31A, 32A, and 33A with application actions 31B, 32B, and 33B can comprise a usage pattern associated with printing a file downloaded from the internet. Similarly, usage pattern 2 includes device interactions 34A, 35A, 36A, and 37A, which can correspond, respectively, to application actions 34B, 35B, 36B, and 37B, and the combination of these device and/or application interactions can comprise a usage pattern associated with scanning a document and sending the scanned copy of the document to another user.

While usage matrix 300, in this example, includes three particular elements of information (represented in the columns of the usage matrix) extracted from the tasks comprising a usage pattern, in other embodiments, other elements, or features, of tasks and/or devices can be included in a usage pattern matrix. For example, an embodiment can include the identity of particular users involved in transferring files to or from a mobile device. An embodiment can include the name, and/or version of an application involved in a task. An embodiment can include a physical location (or, a cloud computing location) of one or more of the computing devices (or, applications) involved in the task. It would be apparent to one of ordinary skill in the art to include a variety of other elements, or features, of tasks in a usage matrix, not limited by the examples herein and within the scope of the disclosure.

Based on usage patterns, an embodiment can determine applications to use on a subset of the computing devices that can eliminate the use of other computing devices in a task associated with a usage pattern. For example, in embodiments, a processor can execute a program to analyze a usage matrix, such as usage matrix 300 of FIG. 3 (or, alternative structure that records a usage pattern) to determine a usage pattern (e.g., downloading and printing a file, scanning and emailing a document). The program can further determine, based on that usage pattern, if an application may be available for one or more of the computing devices included in the usage pattern, and which can eliminate or simplify use of one or more other computing devices included in the usage pattern. For example, from analyzing usage pattern number 1 in FIG. 3, a program can suggest, or recommend, to the user to install an application on the mobile device that can enable the user to directly print a file from the mobile device and avoid use of the computer as an intermediary device. Similarly, from an analysis of usage pattern number 2, a program can suggest, or recommend, to the user to install an application on the mobile device that can enable the user to directly scan a document for sending (the digital copy) to another user.

Figure 4:
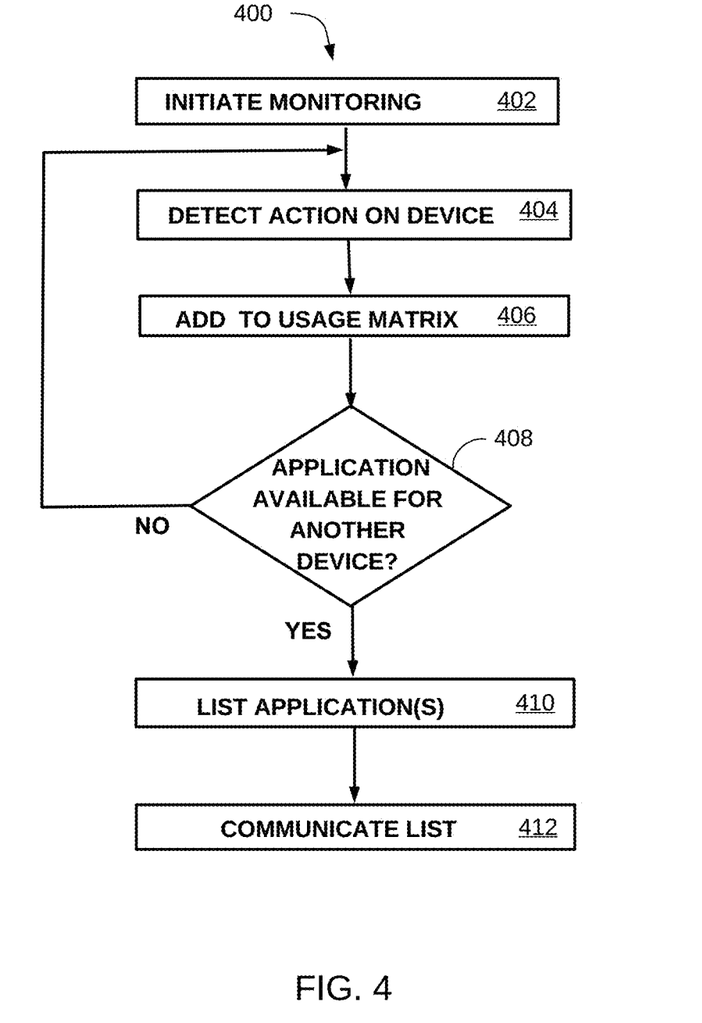
FIG. 4 illustrates an example method to determine a usage pattern and recommend a program, according to aspects of the disclosure.

Accordingly, FIG. 4 illustrates an example method 400 to determine applications to recommend to a user to improve the efficiency of performing tasks derived from, or associated with, usage patterns of various computing devices the user employs to perform particular tasks. To illustrate the method, but not intended to limit embodiments, the method is described as performed by a program executing on a processor that can detect tasks on the various computing devices. The program can execute on one of the user's computing devices, on a combination of the user's devices (e.g., operating as a distributed program), or on devices that otherwise can detect or monitor tasks and/or device interactions (e.g., from usage logs that may be made and/or kept on the devices or services that connect to the devices).

Further, for purposes only of illustrating the method but not to limit embodiments, the program is described as recording and analyzing tasks and/or devices comprising a usage pattern using a usage matrix, such as illustrated in matrix 300 of FIG. 3. However, it would be apparent to one of ordinary skill in the art that the tasks and/or devices can be recorded, or analyzed, using data structures other than a usage pattern matrix as illustrated in FIG. 3.

At 402, the program initiates monitoring tasks performed on a set of (e.g., a particular user's) computing devices. At 404, the program detects a task performing a particular action on a particular one of the computing devices. For example, at 404 the program can detect an application on mobile device 110 of FIGS. 1A and 2A sending or receiving a digital media file. The program can detect the tasks by means of, for example, detecting that a particular program or application has been activated on the user's device, such as by inspecting program or application logs on the device.

Embodiments can detect a task by trapping to a monitor function of the program when a program or application is started, or takes a particular action (e.g., sending an email). Some embodiments can detect a task by examination of a file system, or files, on a user device to detect changes (e.g., a newly downloaded file) in the file system and/or files, or operations performed on the files. Embodiments can detect an action the device takes, such as connecting to a WIFI network, or to a printer or a scanner, for example. It would be apparent to one of ordinary skill in the art that there are a variety of techniques known in the art to detect a device, and/or an application executing on a device, performing a task or taking a particular action.

At 406 the program adds the action to a usage matrix, such as illustrated in FIG. 3. If the program has previously detected the same action, and the action is presently included in the matrix, the program can, for example, increment a count of the number times the action is performed, or determine frequency of the action. The program can, optionally, store the matrix in a memory of one or more of the computing devices, or another computer, for use in subsequent periods of monitoring tasks performed on the computing devices.

The program can organize the matrix in a variety of manners to record the particular actions, and/or to associate actions performed on one device with actions performed on one or more other devices. For example, the program can organize actions in the matrix based on a category of an action (or, categories of tasks that include particular actions) such as "image actions", "document actions", or "message actions", or a category of the type of computing device on which the user performed the action (e.g., "mobile device", "laptop computer", or "tablet computer"). An embodiment can employ a variety of categories of broader or narrower scope, according to the granularity of particular actions that the program, at 404, detects.

At 408, the program analyzes the actions performed by the applications on the particular devices, and/or the actions of the devices themselves, as recorded in the usage pattern matrix. As part of the analysis, the program correlates the devices, applications, and actions recorded therein to determine usage patterns. Based on such correlations, the program can determine that an application exists for one of the devices in the usage pattern that can substitute for a combination of other applications and/or devices included in the particular usage pattern.

For example, the program can analyze the usage matrix to correlate receiving a document via an email application on a mobile device with transferring the file from the mobile device to a computer, and the computer then sending the file to a printer. Based on that correlation, the program can determine that a printer application available for the mobile device can substitute for the combination of sending a file to the computer, and the computer then sending the file to the printer (e.g., the printer application can directly send a file to the printer).

In another example, the program can analyze the usage matrix to correlate scanning documents to a computer, and then transferring the scanned media file to a mobile device. At 408, the program can determine, based on that correlation, that a scanner application is available for the mobile device to directly scan a document, and that installing the scanner application on the mobile device can then omit the combined actions of scanning documents to the computer and transferring the scanned media file to the mobile device.

At 408, the program identifies one or more applications that can substitute, on a particular device, for a combination of devices and/or applications the program identifies (as correlated) in analyzing the usage matrix. In embodiments the program can refer to a database of applications, for example, to identify the particular applications. A database can, for example, organize applications by type of application and associate the applications with types of computing devices (or, models of computing device types) on which the applications can execute, and the types of tasks the application can perform. Such a database can be stored within the program, or in a storage medium the program can access on the mobile device, on another computer, or in a cloud computing environment, for example.

In other embodiments, the program can query one or more libraries or application stores to determine the existence of applications that correlate to computing tasks included in a particular usage pattern, and whether the applications are available for a particular device (e.g., type or model of a mobile device included in the usage pattern).

The program can search a database or library based on a particular type of task or application (e.g., printing, messaging, scanning, or emailing), and select applications that match the particular task or application type according to whether or not it can execute on a particular computing device (e.g., the type or model of that device), or according to other criteria such as version or level of the application.

It would be apparent to one of ordinary skill in the art that, at 408, an embodiment can employ a variety of criteria to correlate tasks, applications, or actions, performed on various computing devices to determine a usage pattern and/or to identify a substitute application, beyond the examples herein, but within the scope of the disclosure. It would be further apparent to one of ordinary skill in the art that embodiments can perform 408 in response to, or in conjunction with, a variety of events or criteria. For example, an embodiment can perform 408 in response to, at 406, adding an action detected at 404 to the usage pattern matrix. In another example, an embodiment can perform 408 based on a usage pattern matrix having accumulated a particular number of actions or a particular number of computing devices.

At 410, the program creates a list of applications determined at 408, to recommend to the user as applications that may benefit the user in performing certain actions or tasks. The list of applications can rank a plurality of applications according to suitability to performing a particular action, or task associated with particular actions, or, for example, according to suitability of the application(s) to replace or augment an existing application on a device or combination of devices.

Suitability can be based on a variety of criteria, such as revision levels of applications installed on the devices and/or available for the devices, cost to purchase an application, resources of a device (e.g., CPU type, or storage or memory) available to store or use an application on that device, and the number of additional functions (e.g., additional tasks in the usage pattern) that an application can perform. At 410, the program can include applications presently installed on the mobile device, such as if there is a more recent revision of the application. Alternatively, at 410, the program can exclude from the application list applications presently installed on the mobile device (e.g., as there is no basis, such as a newer version, for replacing the presently installed application).

In some embodiments, at 404 the program can detect the user performing an action on more than one computing device. For example, an instance of the program can be installed on each of a plurality of computing devices used by a particular user. Each instance can detect actions or tasks performed on the respective computing device, and each instance can add the tasks or actions to usage matrix particular to that device, or to a usage matrix shared by all instances (e.g., a common usage matrix synchronized by the program instances using a network connecting them). In embodiments, a program executing on one computing device, at 408, can access a usage matrix, or at 410 an application list, recorded on the plurality of computing devices.

At 410, a program executing on one of the computing devices can list applications according to which device supports them, or which is best suited for them. For example, a printing application can be available for both a mobile device and a computer. However, based on actions recorded by the program(s) at 404 as performed on the mobile device (e.g., a high incidence or frequency of actions that correlate with printing) and/or the computer (e.g., a low incidence or frequency of actions that correlate with printing), the program can prioritize (or, rank higher), for example, the mobile device printer application over the computer printer application (or, alternatively include the mobile device application in the list, and exclude the computer application from the list). It would be apparent to one of ordinary skill in the art that an embodiment can employ a variety of criteria to include, or rank (or, prioritize) particular applications, on particular computing devices, in an application list created at 410.

At 412, the program outputs, or communicates, the recommended applications. The recommendation can identify the application(s) by an application name and can include a revision level and a location (e.g., a particular online library or application store) from which a user can obtain the application(s).

The program can, for example, output the recommendation to a service (e.g., a cloud computing service or application store service associated with a device or user), and the service can process and communicate some or all of the recommendations to a user managing the device(s) associated with the recommended applications. In another example, the program can generate a notification or alert to the user and the notification can include, or reference, the recommended application(s). In some embodiments, an instance of the program can generate a notification (or, alert) on one computing device and the notification can include computing devices other than, or in addition to, the computing device that receives the notification. For example, an embodiment can, at 412, notify a user with an alert on a mobile device, and the notification can be in regard to recommending an application available for a computer, or tablet device, and may or may not include an application for the mobile device.

The program can perform method 400 periodically, and can record results of the method for use in subsequent executions of the method. It would be apparent to one of ordinary skill in the art that an embodiment can perform particular operations of the method at different times than other operations, or that an embodiment can perform some operations of the method on one computing device (used by a user) and perform other operations on one or more other computing devices (used by the user), and that the embodiment can synchronize operations, and results of operations, performed on each of the computing devices individually.

Figure 5:
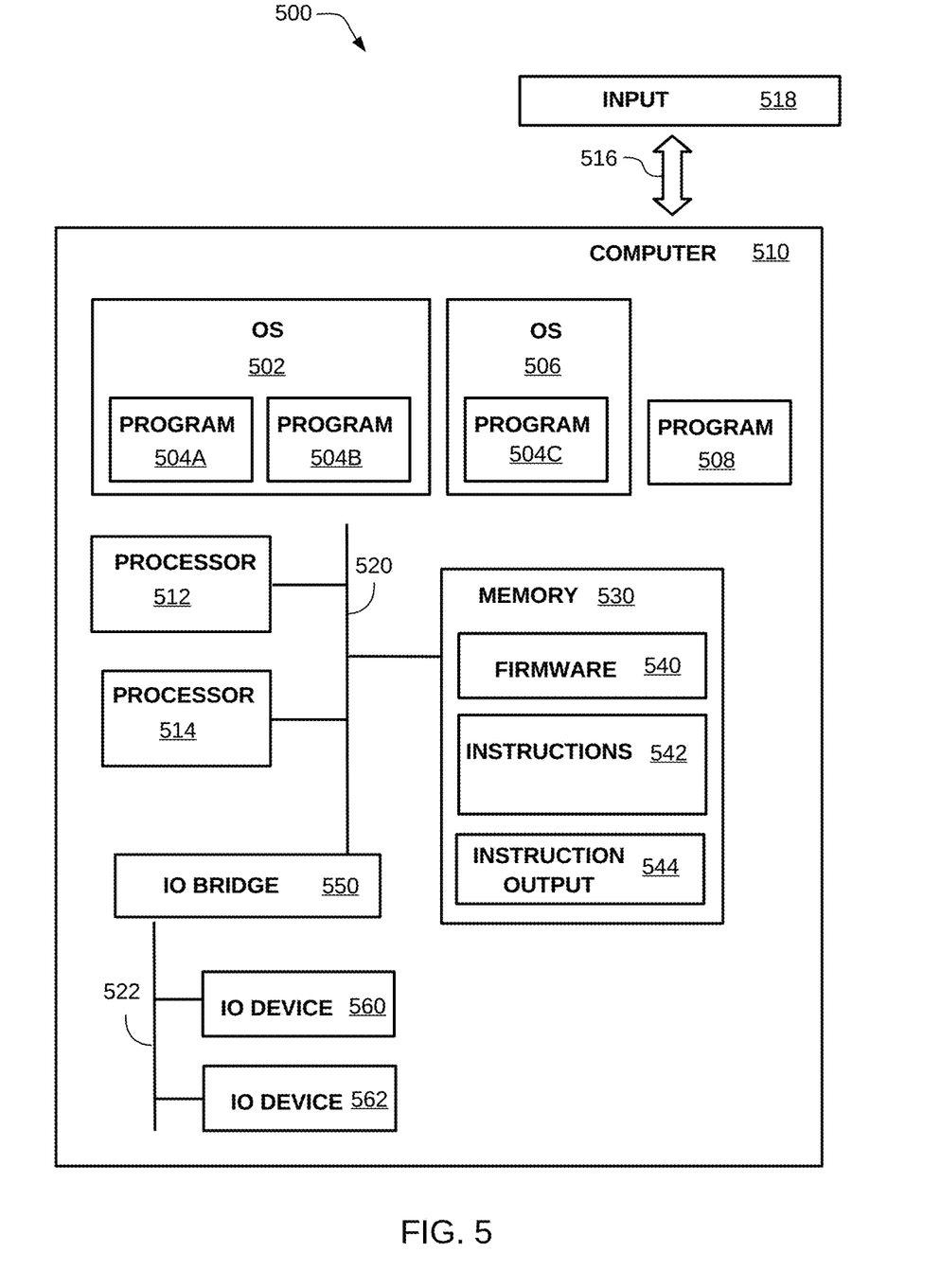
FIG. 5 illustrates an example computer, according to aspects of the disclosure.

Embodiments of the disclosure can be, or can include a computer system, such as illustrated in the example of FIG. 5. As shown in FIG. 5, computer system 500 includes computer 510 having processors 512 and 514. In embodiments, processors can be a single processor or a multi-threaded processor, a general purpose or a special purpose processor, a co-processor, or any of a variety of processing devices that can execute computing instructions.

Computer system 500 is configured with interface 516 coupling computer 510 to input source 518. In embodiments, interface 516 can enable computer 510 to receive, or otherwise access input data, such as tasks and/or devices performing the tasks to determine a usage pattern. Interface 516 can be, for example, a network (e.g., an intranet, or a public network such as the Internet), or a storage medium, such as a disk drive internal or connected to computer 510. Input source 518 can be, for example, a program operating on, or in communication with, a user device, and input source 518 can provide information regarding tasks, applications, or device actions on the user device to computer 510, or otherwise enable computer 510 to receive the information, using interface 516.

Interface 516 can be configured to receive human input, or to couple computer 510 to other input devices, such as described later in regard to components of computer 510. It would be apparent to one of ordinary skill in the art that the interface can be any of a variety of interface types or mechanisms suitable for a computer, or a program operating in a computer, to receive or otherwise access or receive a source netlist.

Processors included in computer 510 are connected by a memory interface 520 to memory 530. In embodiments, a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 520, between a processor (or, processors) and a memory (or, memories) can be, for example, a memory bus common to one or more processors and one or more memories. In some embodiments, a memory interface, such as 520, between a processor and a memory can be point to point connection between the processor and the memory, and each processor in the computer can have a point-to-point connection to each of one or more of the memories. In other embodiments, a processor (for example, 512) can be connected to a memory (e.g., memory 530) by means of a connection (not shown) to another processor (e.g., 514) connected to the memory (e.g., 520 from processor 514 to memory 530).

A computer can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 510 includes IO bridge 550 interfacing memory interface 520 to IO devices, such as IO device 560. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices, such as 560 and 562, by means of an IO interface, or IO bus, such as IO bus 522 of computer 510. For example, IO bus 522 can be a PCI-Express or other IO bus. IO devices can be any of a variety of peripheral IO devices or IO adapters connecting to peripheral IO devices. For example, IO devices 560 and 562 can be a graphic card, keyboard or other input device, a hard drive or other storage device, a network interface cards, etc. IO device 560 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 5, computer 510 includes a plurality of programs, such as programs 504A-504C and 508. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure.

A program can be a program that embodies the methods, or portions thereof, of the disclosure. For example, a program can be a program that executes on a processor of computer 510 to perform the example method 400 of FIG. 4, or portions thereof.

Programs can be "stand-alone" programs that execute on processors and use memory within the computer directly, without requiring another program to control their execution or their use of resources of the computer. For example, computer 510 includes stand-alone program 508. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 510 includes operating systems (OSes) 502 and 506, each of which can include, or manage execution of, one or more programs, such as OS 502 including (or, managing) program 504A and 504B and OS 506 including (or, managing) program 504C. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 510 includes firmware 540 stored in memory 530. In other embodiments, firmware can be embodied as instructions (e.g., comprising a computer program product) on a storage medium (e.g., a CD ROM, a flash memory, or a disk drive), and the computer can access the instructions from the storage medium.

In embodiments of the present disclosure, a computer can include instructions to perform the example method 400 of FIG. 4, or portions thereof. Computer 510 includes, for example, instructions 542 which, when executed by one or more of processors 512 and 514, can operate to perform one or more of the functions of method 400 discussed above to generate or analyze, for example, a usage matrix and can store the usage matrix, or a list of recommended applications, in instruction output 544. The computer can store the instructions and/or the instruction output in a memory of the computer, such as computer 510 storing program instructions 542 and instruction output 544 in memory 530.

The example computer system 500 and computer 510 are not intended to limiting to embodiments. In embodiments, computer system 500 can include a plurality of processors, interfaces, and <inputs> and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 510 can be, for example, a computing device having a processor capable of executing computing instructions and, optionally, a memory in communication with the processor. For example, computer 510 can be a desktop or computer; a tablet computer, mobile computing device, or cellular phone; or, a server computer, a high-performance computer, or a super computer. Computer 510 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for reducing interactions of computing devices, wherein the computing devices comprise at least a first computing device and a second computing device, the method comprising:
   detecting, by a first processor, the first computing device performing a first task;
   detecting, by the first processor, the second computing device performing a second task,
      wherein the second task provides a second function to the second computing device, and
      wherein the first computing device does not have the second function;
   determining, by the first processor, a usage pattern, wherein the usage pattern comprises interactions between the computing devices, the computing devices involved, and tasks performed by each computing device of the computing devices;
   correlating the interactions between the computing devices and the tasks performed by each computing device of the computing devices;
   identifying, based on the correlating, intermediate transfer tasks that transfer data files between the computing devices;
   identifying, by the first processor, based at least in part on the usage pattern and the intermediate transfer tasks, an at least one program that enables the first computing device to perform a third task that achieves a same result as the second task, provides the second function to the first computing device, and eliminates one or more of the intermediate transfer tasks; and
   outputting, by the first processor, a recommendation to install the at least one program on the first computing device.

2. The method of claim 1, wherein the first and the second computing device are each selected from a group consisting of: a mobile device, a wearable computing device, and a computer.

3. The method of claim 1, wherein the first processor is communicatively coupled to a second processor, and wherein the first and the second processor communicate to perform the method.

4. The method of claim 1, wherein the first processor outputting the recommendation results in a notification to a user of the first computing device.

5. The method of claim 1, wherein the recommendation comprises an identity of the at least one program and a location from which to obtain the at least one program.

6. The method of claim 1, wherein identifying the at least one program is based, at least in part, on a suitability criteria associated with the at least one program, the at least one program associated with the first computing device performing at least one of the first task and the second task.

7. The method of claim 6, wherein the suitability criteria comprise at least one of: a revision level of the at least one program, a cost of the at least one program, computing resources of the first computing device, or a number of functions that the at least one program can perform.

8. The method of claim 1, wherein, when detecting the second computing device performing the second task, the second computing device interacts with the first computing device to perform the second function for the first computing device.

9. The method of claim 1, wherein the usage pattern is a usage matrix that records devices, connections, applications, and interactions of the first computing device and the second computing device.

* * * * *